3,037,017
REACTION OF STARCH WITH STYRENE OXIDE
Kenneth P. Satterly, Mendenhall, Pa., assignor to Standard Brands Incorporated, New York, N.Y., a corporation of Delaware
No Drawing. Filed Sept. 18, 1958, Ser. No. 761,672
3 Claims. (Cl. 260—233.3)

This invention relates generally to the manufacture of a new modified starch useful for sizing textiles and paper and suitable for other industrial purposes.

More particularly the invention relates to what may be considered etherification of starches, or starch materials, in an alkaline medium by means of an aryl epoxide such as styrene oxide. Starches to be reacted in accordance with this invention, with the styrene oxide are both common and modified, including acid modified starch, oxidized starch, dextrins such as white dextrins, canary dextrins and British gums.

By the term "common" starch, is meant "unmodified," or "native," starch which has not been chemically altered from the original natural state.

Etherification of amylaceous material has heretofore been practiced but with such chemicals and under such drastic conditions as usually result in destroying the granular form of the amylaceous material and requiring what may be considered excessive quantities of the etherifying and other chemical agents. Where epoxy compounds have been used they have usually been selected from the alkylene series all of which are water soluble.

In accordance with my invention, etherification is accomplished by the use of certain of the aryl series of epoxy compounds, which are, for all practical purposes, water insoluble. The aryl epoxide is vigorously and thoroughly mixed into a water slurry containing any of the above named starches in ungelatinized condition, under mild conditions of alkalinity and temperature, and the reaction is allowed to proceed for a period of time which may be varied in accordance with the alkalinity, temperature and other factors.

When manufactured under the selected and controlled conditions of this process, the etherified starch product possesses substantially the same finished characteristics as to filterability and ease of handling as does the original amylaceous material. Furthermore, when the product is pasted, as in the preparation of sizing, the chemical and physical properties it exhibits excellently qualify it for use as sizing.

The superiority of my new method and the product thereof may be perceived in part by a few comparisons with prior methods and products involving etherification of amylaceous material. Some prior investigators, as evidenced by their patents, have reacted starches with alkylene epoxides, usually, it is understood, in the presence of large percentages of caustic alkalis, generally employing large percentages of such oxides. It is understood that the resultant products become greatly swollen in cold water and are difficult if not impossible to filter by standard methods employed in the starch industry.

The general object of this invention is to effect a partial etherification of starches by reacting unswollen starch granules in a water slurry containing a comparatively small percentage of an aryl epoxide such as styrene oxide, under relatively mild alkaline conditions.

In practice, a water slurry of starch material at a density of about 5° to 24° Bé. is treated with about 0.5 to 5% styrene oxide (based on the dry weight of the starch) thoroughly blended into the slurry, the slurry being previously adjusted to a pH of approximately 8.5 by the addition of a small percentage of an appropriate alkali. The reaction is facilitated by maintaining the temperature of the slurry within a range of 70° to 140° F. The duration of the reaction is subject to considerable variation, and may range from 2 to 21 hours. Extending the reaction time beyond 21 hours is not known to be advantageous.

As may be expected, the process is subject to considerable variation. For example, a higher degree of alkalinity may be maintained during the reaction period within the approximate range of 8 pH to 11 pH. An increase in alkalinity above the upper end of the range is not recommended in view of the danger of causing the starch material to paste during the reaction treatment. The maintenance of the alkalinity near the upper end of the range may be employed to shorten the reaction time.

Also, by increasing the temperature of the slurry the reaction time may be shortened, but it is not recommended that the temperature be allowed to approach very near to the gelatinization point of the amylaceous material which, in general, will be about 140° F.

The preferred range of concentration of the aryl epoxide used will be from 0.5 to 5% based on the dry weight of the starch material. A higher concentration of the aryl epoxide beyond the indicated range may be used effectively to shorten the reaction time, but in view of the present high cost of such etherifying agents, the use of such higher concentration ordinarily would not be economical. It is found that 1% of the aryl epoxide is sufficient and economical to use.

With reference to the solids concentration of the starch it may be said that the reaction will proceed effectively and economically with starch slurries of 5° to 24° Bé. containing about 8%–43% dry starch. The reaction proceeds more rapidly with the higher solids concentration.

The desired alkalinity of the slurry during the reaction period may be effected by the use of any of the alkaline earth hydroxides, alkali salts or other agents capable of reacting with water to liberate hydroxyl ions. The alkalinity, in the process of this invention, should not exceed such a concentration as would cause the swelling of the amylaceous material, thus physically altering the original granular form of the material.

In the practice of the process the reaction is allowed to continue until there has been effected etherification to the desired extent. In the preparation of material for sizing, a reaction time of 21 hours with the alkalinity at about 8.5 pH and the styrene oxide present in a concentration of about 1% is found to be satisfactory. Additional reaction time may be employed, but appears to be without advantage.

When the desired reaction has been completed the product is ready for use if desired, but if it is to be shipped and stored before use as sizing material it will preferably be filtered, washed, and dried in accordance with conventional methods employed in the starch industry. The washing operation is optional and is not an essential part of the process.

As a specific example of the process, a slurry of common starch at a density of 18° Bé. has its pH adjusted to 8.5 by the addition of sodium carbonate, styrene oxide is added in the proportion of 1% of the dry starch substance to the slurry, the mixture is agitated to disperse the styrene oxide, and the mixture is heated to and maintained at 130° F. for 21 hours. This aqueous mixture then may be used in the conventional preparation of sizing, or it may be filtered, washed and dried by conventional methods and held in the dry state prior to such use.

If the etherified starch is to be used at once for the preparation of sizing, and hence does not need to be stored in dry form, the temperature during the reaction may be elevated above the gelatinization temperature, and at such higher temperature the reaction will proceed more rapidly.

The above described method for the etherification of starches yields products in which the original granule structure is retained and which can easily be separated from the reaction mixtures, washed, dried, and, if desired, powdered, by conventional methods. It is found that pastes made from the reacted product are exceptionally satisfactory for sizing. The paste formed upon cooking with water has a very smooth, grease-like consistency, which would indicate its non-cohesive nature. The paste after cooling and standing exhibits greatly reduced tendency toward jellying and thickening.

The films which can be cast from sizes prepared with the pasted, reacted starches will be found to be less brittle, will have improved clarity, and will have improved adhesion characteristics when compared with heretofore known films produced from other starch sizing material.

The sizing of yarn, as is well known, provides a protective covering surrounding the yarn and protecting it during the weaving operation. This protective covering serves several useful purposes. The size protects the yarn from shedding, increases the tensile strength of the yarn, and acts as a barrier to protect the yarn from abrasion. Sizes prepared with the reaction products of this invention have been found to increase the tensile strength of yarn as much as 20% above the tensile strength of yarns sized with some of the best known and most extensively used sizes heretofore produced by other methods.

This application is a continuation-in-part of my application Serial No. 384,779, filed October 7, 1953, now abandoned.

It should now be apparent that this invention is subject to considerable variation within the limits and subject to the factors described above, without departing from the principles of the invention, and such variations are intended to be embraced within the appended claims.

Having shown and described my invention, I claim:

1. A method of etherifying unswollen granule starch comprising reacting styrene oxide with an 18° Bé. water slurry of common starch maintained at a temperature of about 130° F. and having an alkalinity of about 8.5 pH attained by the addition thereto only of sodium carbonate, the amount of styrene oxide used being about 1% of the dry weight of the starch, continuing the reaction for a period of 2 to 21 hours without altering the original granule structure, and filtering and drying the starch.

2. A method of etherifying unswollen granule starch comprising reacting styrene oxide with a water slurry of common starch having a density of about 18° to 24° Bé. maintained at a temperature below the gelatinization temperature of the starch and having an alkalinity of about 8.5 pH attained by the addition thereto only of sodium carbonate, the amount of styrene oxide used being about 1% of the dry weight of the starch, continuing the reaction for a period of 2 to 21 hours without altering the original granule structure, and filtering and drying the starch.

3. A method of etherifying unswollen granule starch comprising reacting for 2 to 21 hours styrene oxide in an amount equivalent to 0.5% to 5% of the dry weight of the starch with a water slurry of the starch having a density of 5° to 24° Bé. and having a temperature ranging between 70° and 140° F. and having a pH between 8.0 and 11.0 established by the addition thereto only of an alkali selected from alkaline earth hydroxides and alkali salts and at such concentration thereof as will withstand in a reaction period of 2 to 21 hours avoid altering the original starch granule structure, and filtering and drying the starch.

References Cited in the file of this patent

UNITED STATES PATENTS

| | | |
|---|---|---|
| 2,516,632 | Kesler et al. | July 25, 1950 |
| 2,516,633 | Kesler et al. | July 25, 1950 |
| 2,682,535 | Broderick | June 29, 1954 |
| 2,733,238 | Kerr et al. | Jan. 31, 1956 |
| 2,801,241 | Hobbs | July 30, 1957 |